United States Patent [19]

Nojiri et al.

[11] Patent Number: 4,656,625
[45] Date of Patent: Apr. 7, 1987

[54] SWITCHING SYSTEM HAVING CAPABILITY FOR TELECOMMUNICATION CONFERENCES

[75] Inventors: Shoji Nojiri, Kawasaki; Kenichi Ogawa; Koso Murakami, both of Yokohama, all of Japan

[73] Assignee: Fujitsu Limited, Kawasaki, Japan

[21] Appl. No.: 738,643

[22] Filed: May 28, 1985

[30] Foreign Application Priority Data

May 30, 1984 [JP] Japan .................................. 59-108526

[51] Int. Cl.⁴ ........................ H04Q 11/04; H04J 3/02; H04M 3/00
[52] U.S. Cl. ..................................... 370/62; 370/112; 379/202
[58] Field of Search .......................... 370/62, 58, 112; 179/18 BC

[56] References Cited

U.S. PATENT DOCUMENTS

| | | | |
|---|---|---|---|
| 3,882,280 | 5/1975 | Goutmann | 179/18 BC |
| 4,244,046 | 1/1981 | Brovard | 370/62 |
| 4,309,572 | 1/1982 | Mori et al. | 370/62 |
| 4,393,496 | 7/1983 | Zeiträeg | 179/18 BC |

Primary Examiner—Douglas W. Olms
Assistant Examiner—Frank M. Scutch, III
Attorney, Agent, or Firm—Staas & Halsey

[57] ABSTRACT

A switching system having a capability for telecommunication conferences, including therein, at least, a speech path memory, a mixing circuit, and a feedback circuit. The speech path memory is operative to store therein voice data signals provided from subscribers holding a conference. The mixing circuit is operative to mix two voice data signals. The feedback circuit is operative to feed the thus mixed voice data signals back to the speech path memory to accumulate therein each set of the mixed voice data signals for the subscriber's subscriber except each own voice data signal, whereby the subscribers receive respective accumulated voice data signals.

22 Claims, 26 Drawing Figures

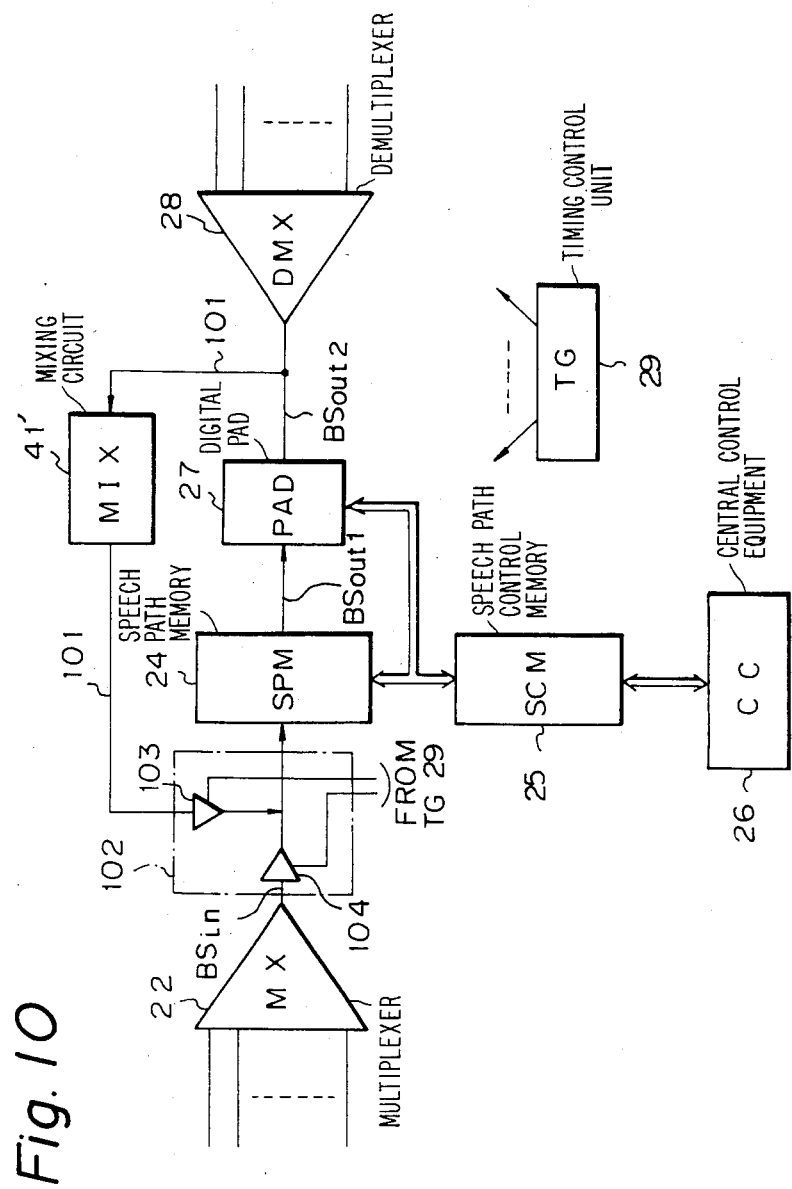

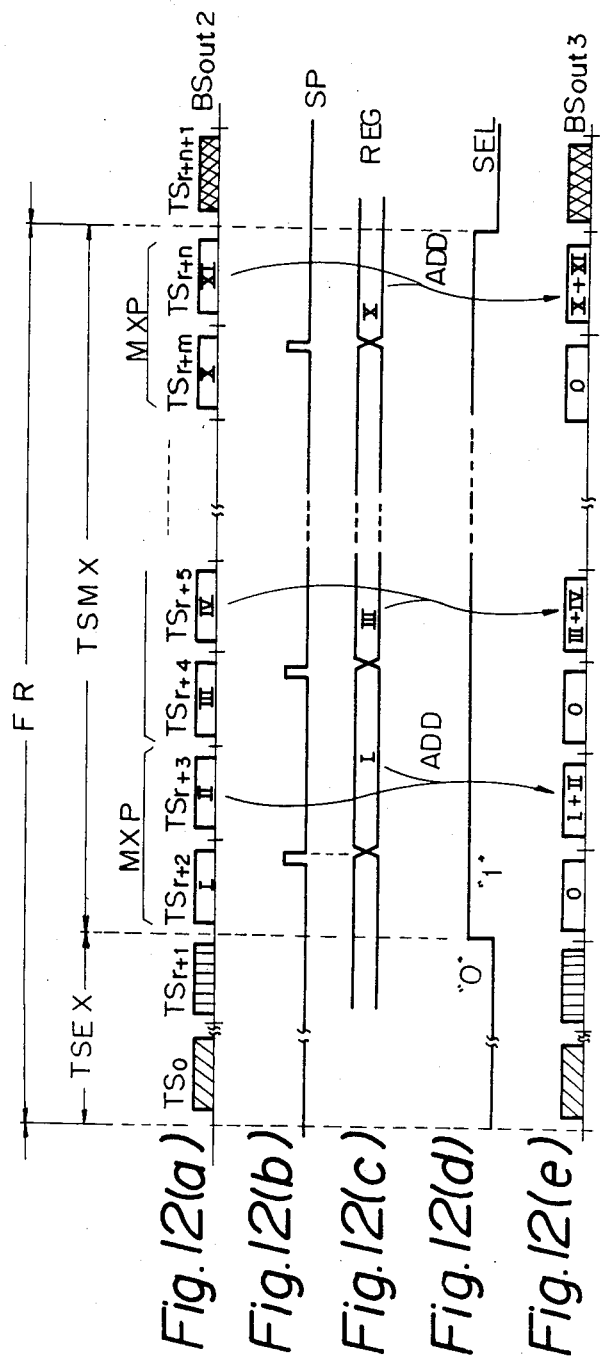

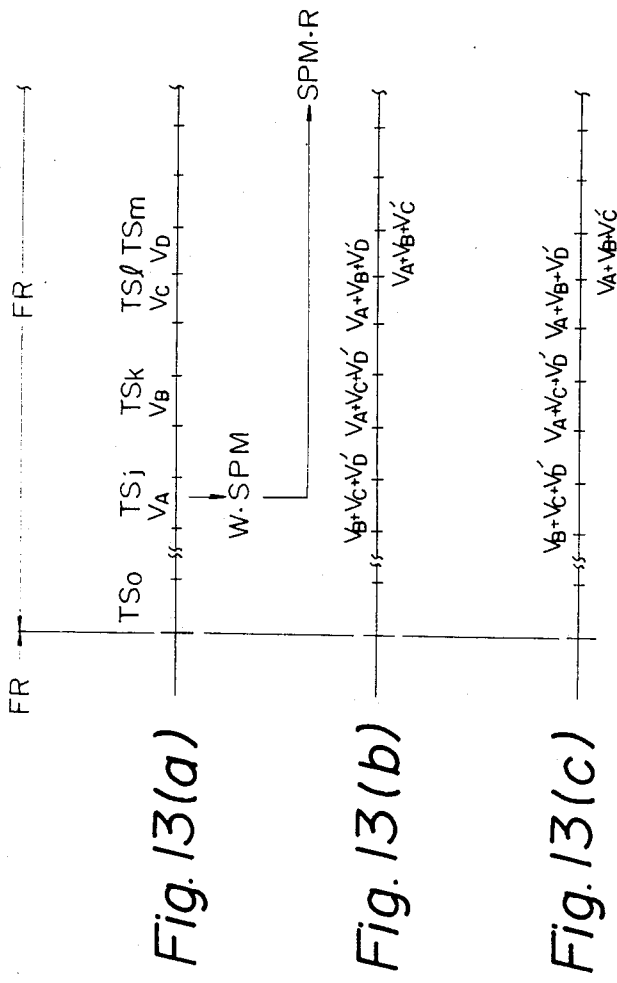

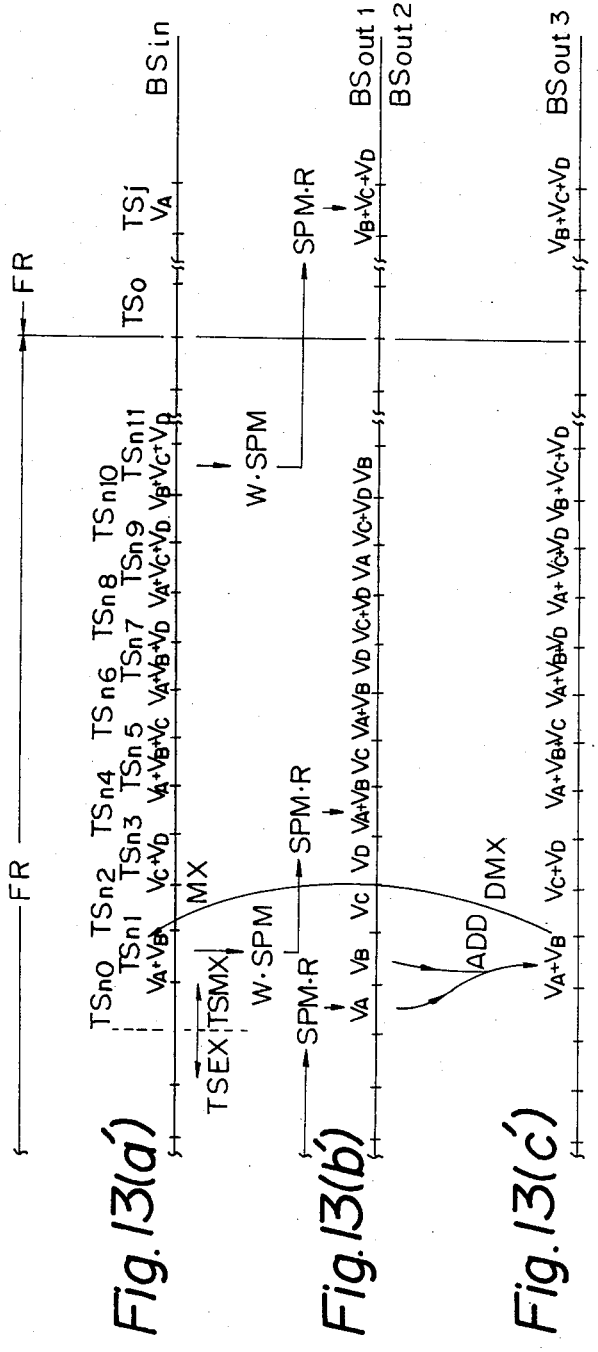

SWITCHING SYSTEM HAVING CAPABILITY FOR TELECOMMUNICATION CONFERENCES

BACKGROUND OF THE INVENTION (1) Field of the Invention

The present invention relates to a switching system, and more particularly, to a technique for a telecommunication conference in a digital switching system incorporated in a time division multiplex network, which technique enables a mixture of voice signals and permits simultaneous communication between three or more subscribers for conference purposes.

(2) Description of the Related Art

Generally, many subscribers are accommodated by a digital switching system. Conversations are usually performed between two subscribers in accordance with switching control. Recently, however, switching systems are being designed to enable telecommunication conferences wherein conversations are performed between three, four or more subscribers. A telecommunication conference is achieved relatively easily by a digital switching system operated in a time division multiplex network through a mixing process using circuit switching. With the above-mentioned mixing process, voice signals transmitted from a plurality of subscriber terminals (telephone sets) are mixed and then distributed to the subscribers concerned therewith.

In prior art switching systems, the mixing process is achieved using a mixing trunk (TRK). As a result, two problems arise. First, if the trunk is designed as a trunk for three persons, the trunk is necessarily limited to use by no more than three subscribers for a conference. Similarly, if it is designed as a trunk for four persons, the trunk is necessarily limited to use by no more than four subscribers. When a trunk is required to cope with more subscribers, the related hardware, such as the incoming-buffer registers and outgoing-buffer registers, necessarily becomes large in scale.

Second, a suitable number of the mixing trunks has to be always available so as to deel with traffic conditions in the switching system, which conditions are determined in advance when the switching system is built.

SUMMARY OF THE INVENTION

An object of the present invention is to provide a switching system capable of overcoming the two problems simultaneously. That is; the switching system of the present invention allows telecommunication conferences among any number of subscribers with simple hardward.

To attain the above object, the switching system of the present invention features a mixing circuit and a feedback circuit instead of the prior art mixing trunk. The mixing circuit operates to mix two voice data signals read from a speech path memory (SPM). The thus mixed voice data signals are rewritten, with the aid of the feedback circuit, into the speech path memory.

BRIEF DESCRIPTION OF THE DRAWINGS

The above object and features of the present invention will be more apparent from the following description of the preferred embodiments with reference to the accompanying drawings, wherein:

FIG. 10 illustrates part of the modification of the switching system of FIG. 4, which employs direct feedback means of voice data signals therein;

FIGS. 12(a) through 12(e) depict timing charts used for explaining the mixing operation according to the present invention;

FIGS. 13(a), 13(b), 13(c), 13(a') 13(b'), and 13(c') depict timing charts used for explaining in detail the present invention by providing an example where four subscribers hold a conference.

DESCRIPTION OF THE PREFERRED EMBODIMENTS

Before describing the embodiments of the present invention, the prior art and the problems therein will be first described with reference to the relevant figures.

Figure 1:
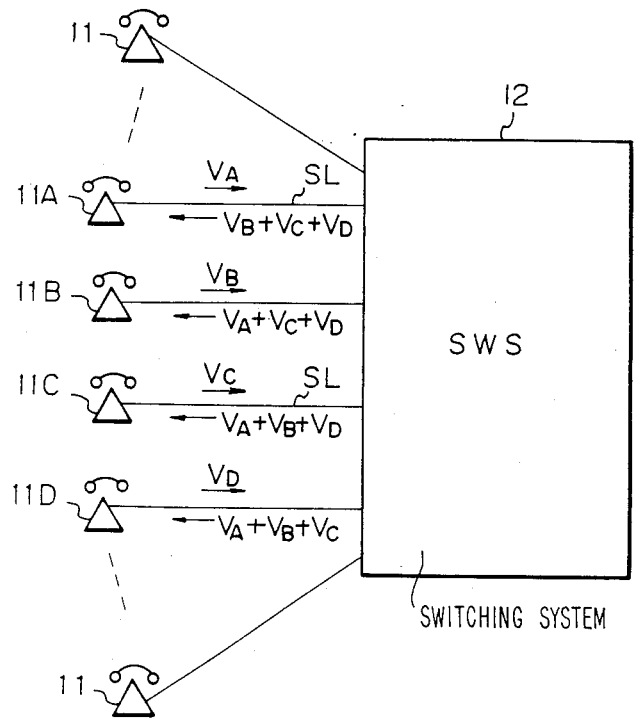
FIG. 1 is a schematic representation of a mixing process for a telecommunication conference.

FIG. 1 depeicts a schematic representation of a mixing process for a telecommunication conference. In this figure, reference numeral 11 indicates a plurality of subscriber terminals, such as telephone sets. Any two or more subscribers can hold conferences or conversations with each other by way of a switching system (SWS) 12 to which the present invention refers. During a telecommunication conference with the subscribers, A, B, C, and D, for example, the switching system 12 receives the voice data signals $V_A$, $V_B$, $V_C$, and $V_D$ from the respective subscriber terminal (11) and then applies a mixing operation to the thus received voice data signals, so that the telephone set 11A is supplied with the mixed voice data signals $V_B+V_C+V_D$, excluding the signals $V_A$ of the particular subscriber receiving the mixed signal. Similarly, the telephone sets 11B, 11C, and 11D are supplied with respective mixed voice data signals, each excluding the voice signal of the respective subscriber receiving the mixed signal, as represented by characters of the voice data signals (V) along the respective subscriber lines SL. Thus, each subscriber can hear voices from other subscribers simultaneously. As a result, the related subscribers can hold a telecommunication conference.

Figure 2:
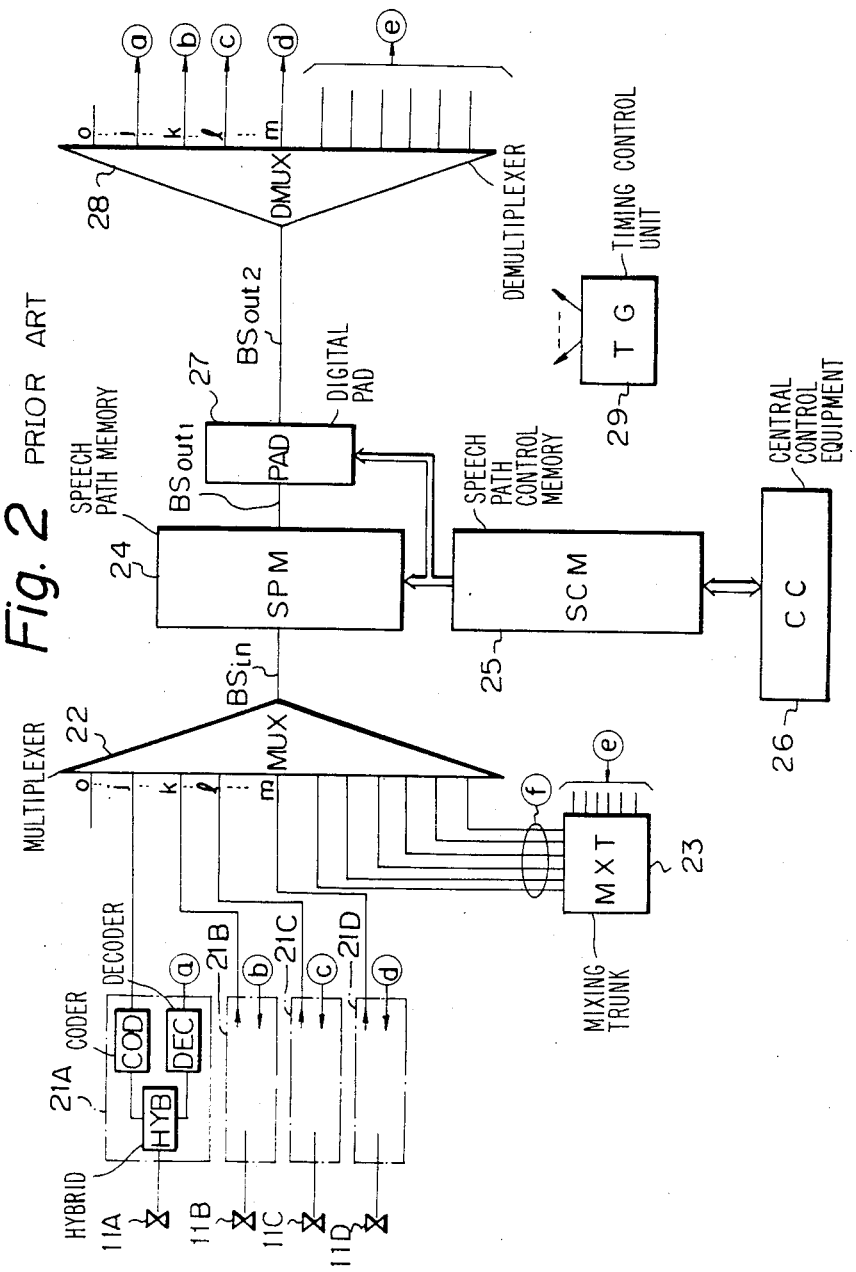
FIG. 2 is a general view of a switching system in which a conventional mixing operation is achieved.

The telecommunication conference is performed, in the prior art, with the mixing operation explained below. FIG. 2 is a general view of a switching system in which a conventional mixing operation is achieved. In FIG. 2, members identical to those previously described are represented by the same reference numerals or characters which is the same for later figures. In FIG. 2, the prior art means for carrying out the mixing operation is characterized as a mixing trunk (MXT) 23. The telephone sets 11A, 11B, 11C, 11D and so forth are connected with a multiplexer circuit (MUX) 22 by way of individual subscriber circuits 21A, 21B, 21C, 21D, and so on. There are, in actuality, many telephone set (11) and subscriber circuit (21) pairs, however, only four pairs, i.e., 11A-21A through 11D-21D, are illustrated for simplicity. The primary constituents of each subscriber circuit (21) are, as illustrated, a two-wire/four-wire system conversion circuit, i.e., a hybrid circuit HYB, a coder COD mounted on a transmitter side, and a decoder DEC mounted on a receiver side. For example, pulse code modulation (PCM) coded voice data signals are transmitted from the coder COD and applied to the multiplexer circuit 22 serially one by one for every telephone set (11). The thus applied serial PCM coded voice signals are converted into parallel voice data signals by the multiplexer circuit 22, which is known as a time division multiplex method. Each frame of the thus multiplexed time division voice data signals of, for example, eight bits is sequentially written at respective allotted time slots into each memory element of a speech path memory (SPM) 24 via an input bus $BS_{in}$ and thus the 8-bit voice data signals are stored in the memory 24.

On the other hand, a read operation from the memory 24 precedes the above-mentioned write (store) operation therein. The read operation is achieved in accordance with address information supplied by a speech path control memory (SCM) 25. Therefore, the voice data signals stored in the memory 24 are read therefrom and output to a first output bus $BS_{out1}$. Incidentally, a read-after-write method may also be used for the read/write control of the speech path memory 24, instead of the above-mentioned write-after-read method.

With respect to the speech path control memory 25, the voice data signals in the memory elements which should be specified and read out therefrom are determined in accordance with correlation to individual time slots to which the subscriber is alloted in dependence on which subscribers, should hold a telecommuniction conference or conversation. In the speech path control memory 25, many memory elements are set up for each time slot, as in the case in the speech path memory 24, so as to store therein the address data for specifying the voice data signals to be read from the speech path memory 24. The gist of the address data is determined by central control equipment (CC0 26 in accordance with dial information sent from an originating subscriber and received, by way of a scanner.

The voice data signals applied to the first output bus BS, are transferred to a second output bus $BS_2$ via a digital pad (PAD) and applied to a demultiplexer circuit (DMX) 28 by which the voice data signals are demultiplexed for every time slot o, j, k, l, and so on, to produce transmitting voice data signals, such as represented by a, b, c, d, and e. These transmitting voice data signals a, b, c, and so on are received by the subscriber circuits (21) alloted with respective time slots and then reach each subscriber unit, i.e., the telephone sets (11), by way of individual decoders DEC.

The operations for performing the above-mentioned switchings are carried out in time slot units. Accordingly, timing management for time slots is required. For this, a timing control unit (TG) 29 is employed in the system. Thus, the switching system can work as a so-called time division multiplex network.

Figure 3:
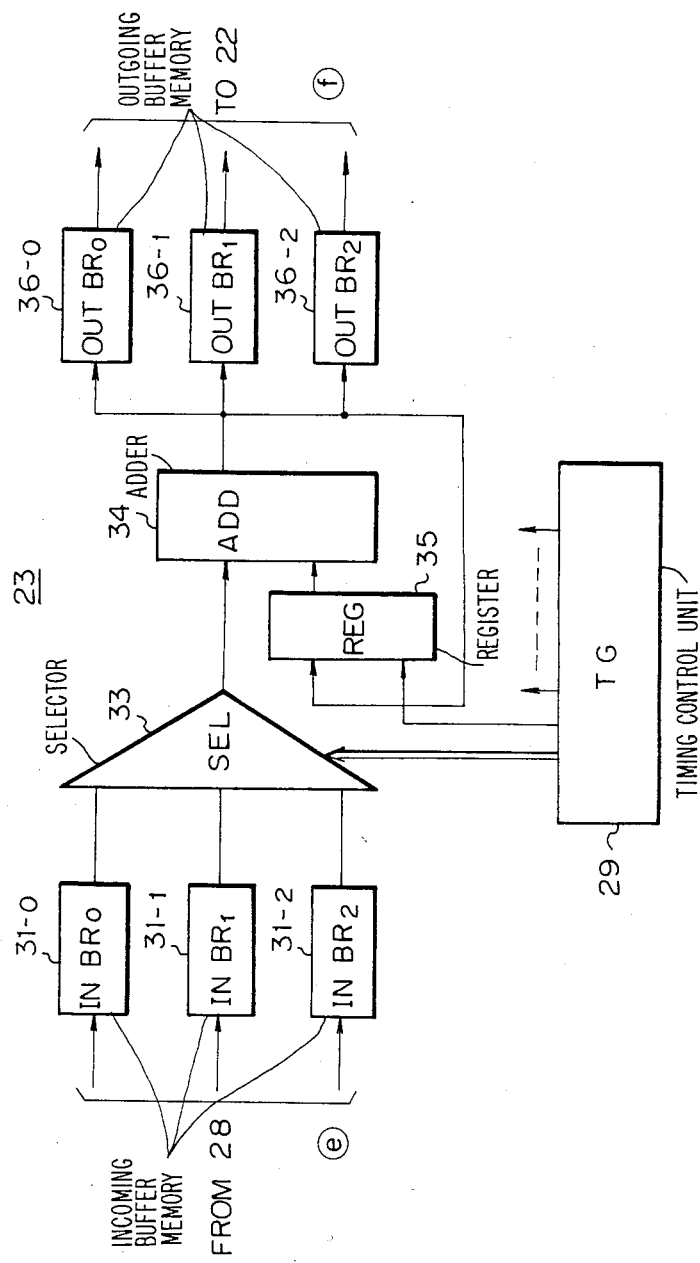
FIG. 3 illustrates in detail an example of the mixing trunk shown in FIG. 2.

In the prior art switching system, the mixing operation is achieved with the use of the mixing trunk (MXT) 23, as mentioned previously. FIG. 3, illustrates in detail an example of the mixing trunk shown in FIG. 2. Assuming that a telecommunication conference is to be held with three subscribers, first, the voice data signals concerned, corresponding to respective time slots, are supplied, as the transmitting voice data signals e, from the demultiplexer circuit 28 and next applied to corresponding incoming buffer memories (INBR$_0$, INBR$_1$, INBR$_2$) 31-0, 31-1, and 31-2 for momentarily storage therein. The stored voice data signals are supplied to one input of an adder (ADD) one by one at predetermined timings controlled by means of a selector (SEL).

Under control of the timing control unit (TG) 29, first, a register (REG) 35 is cleared to hold an initial value 0. Second, the content of the incoming buffer register (INBR$_0$) 31-0 is input, by control of the selector (SEL) 33, to the adder 34. As a result, the content of the incoming buffer register 31-0 is loaded into the register 35. Next, the incoming buffer register 31-1 is selected by the selector 33 and the content thereof is supplied to one input of the adder 34. At the same time, the content, now stored in the register 35, is supplied to the other input of adder 34 to add the related two voice data signals at its two inputs. The resultant added signal from the adder 34 is loaded into the register 35. Further, the incoming buffer register 31-2 is selected by the selector 33 and the content thereof is supplied to one input of the adder 34. At the same time, the content, now stored in the register 35, is supplied to the other input of the adder 34 to add the related two voice data signals at its two inputs. Thus, the register 35 contains therein the content of the incoming buffer registers 31-0, 31-1, and 31-2. The content comprises information being communicated by the three subscribers which hold the conference.

After accumulation of the three voice data signals in the register 35, under control of the timing control unit (TG) 29, the adder 34 is converted to act as a subtractor. It receives the contents from the incoming buffer registers 31-0, 31-1, and 31-2 sequentially by the control of the selector 33. The content of the register 35 is subtracted from the content of the incoming buffer register 31-0 and the thus subtracted content is transferred to the outgoing buffer register (OUTBR$_0$) 36-0. During the above-mentioned subtraction, the content of the register 35 is not renewed. Therefore, the register 35 holds therein the mixed telecommunication information as it is unchanged (including the three subscriber voices) and supplies each bit of the telecommunication information excluding its own information sequentially to the outgoing buffer registers (OUTBR$_1$, OUTBR$_2$) 36-1 and 36-2. The contents thus supplied to the outgoing buffer registers 36-0, 36-1, and 36-2 are fed back to the multiplexer circuit 22 (FIG. 2) and finally distributed to the three subscribers concerned by way of the speech path memory 24, the digital pad 27, and the demultiplexer circuit 28. Consequently, the outgoing buffer registers 36-0, 36-1, and 36-2 store therein the voice data signals $V_B+V_C$, $V_A+V_C$, and $V_A+V_B$, respectively, assuming that the incoming buffer registers 31-0, 31-1, and 31-2 have the three subscribers voice data signals $V_A$, $V_B$, and $V_C$ of FIG. 1, respectively.

Figure 4:
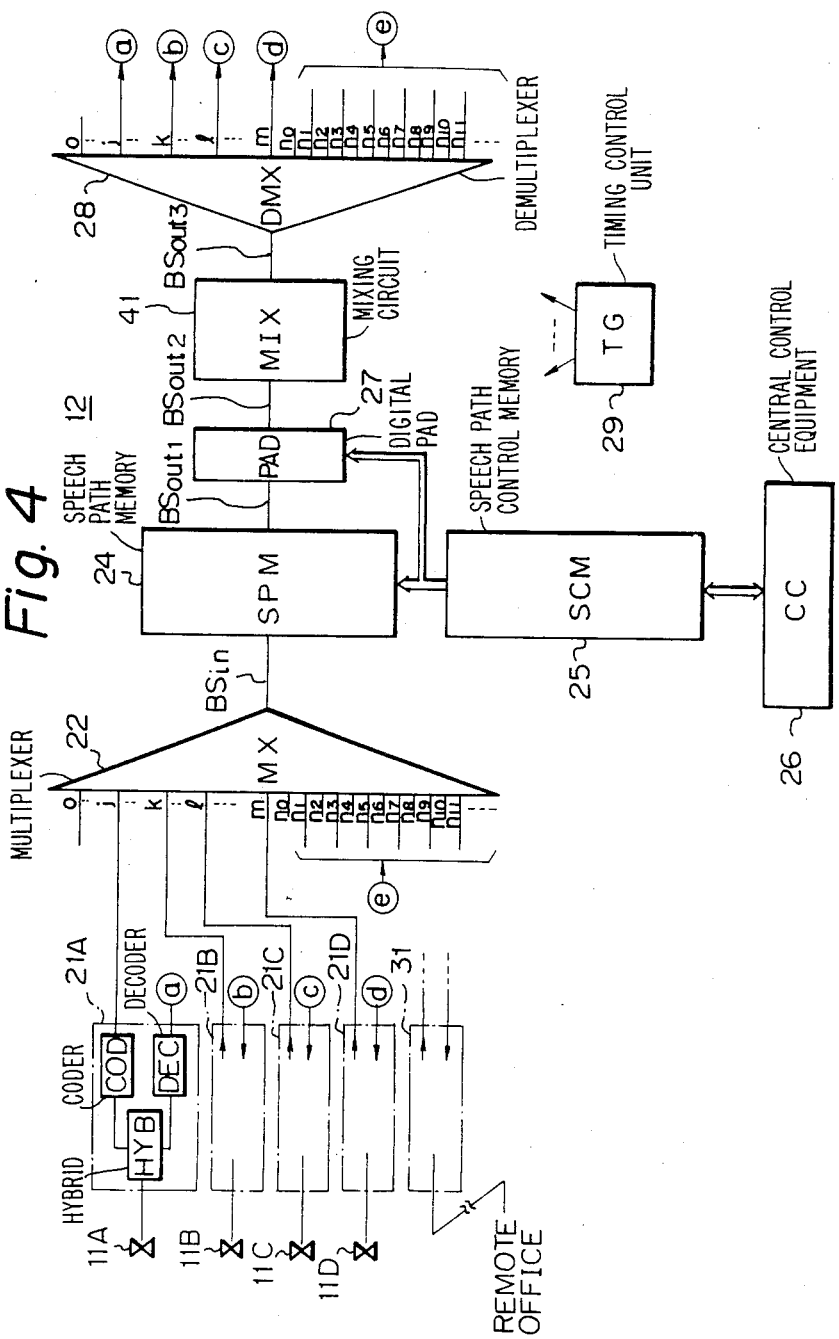
FIG. 4 is a switching system according to an embodiment of the present invention.
Figure 5:
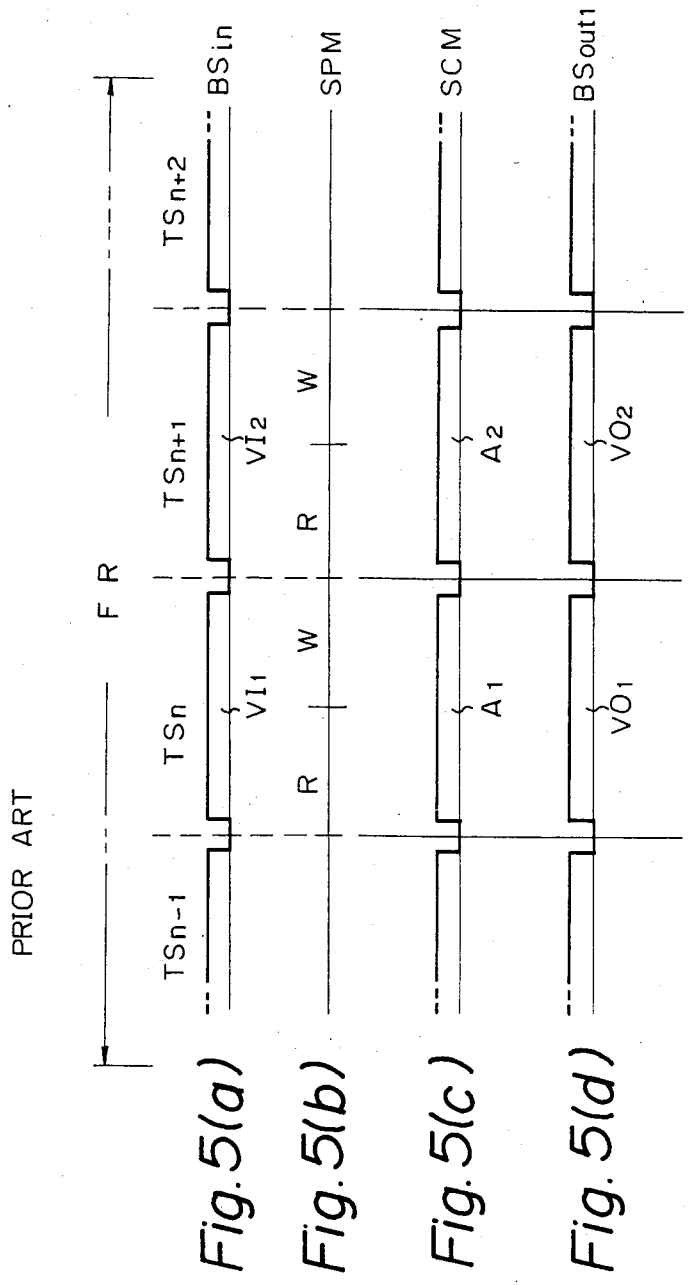
FIGS. 5(a) through 5(d) depict time charts used for explaining a general operation achieved between the speech path memory, 24 and the speech path control memory 25, both shown in FIG. 2.
Figure 6:
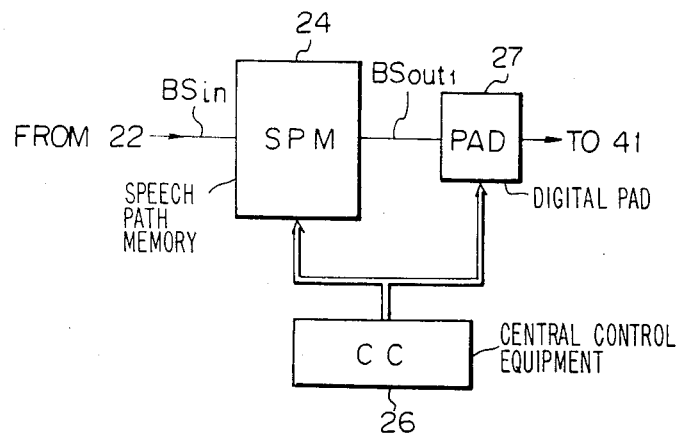
FIG. 6 illustrates part of a modification of the switching system of FIG. 4.

FIG. 4 is a switching system according to an embodiment of the present invention. The differences in FIG. 4 and FIG. 2 are that, first, no mixing trunk 23 is used and, second, a mixing circuit (MIX) 41 is nearly employed and mounted between the digital pad 27 (or the speech path memory 24 if such pad 27 is not used) and the demultiplexer circuit 28. The mixing operation itself for the voice data signals is quite different from the prior art mixing operation, although the related difference is not well expressed in this particular figure. It should be understood, however, that the basic switching operation is substantially the same as that explained with reference to FIG. 2. FIG. 5(a) through 5(d) depict time charts used for explaining a general operation achieved between the speech path memory 24 and the speech path control memory 25 both shown in FIG. 2. The time charts of FIG. 5 well exemplify the above-mentioned basic switching operation carried out in not only the prior art switching system of FIG. 2, but also the switching system of the present invention shown in FIG. 4. It should be noted that the speech path memory (SPM) 24 may be directly controlled by the central control equipment (CC) 26 without introducing speech path control means therebetween, as shown in FIG. 6. FIG. 6 illustrates a part of a modification of the switching system of FIG. 4. This modification can also be applied to the switching system of FIG. 2.

The time charts of FIGS. 5(a) through 5(d) represent arbitrarily one frame FR extracted selectively from an (n-1)th time slot $TS_{n-1}$ to an (n+2)th time slot. To be specific, FIG. 5(a) depicts input voice data signals, represented as $VI_1$ and $VI_2$, to be written into the speech path memory (SPM) 24 and provided on the input bus $BS_{in}$ therefor, FIG. 5(b) indicates operation modes of the speech path memory (SPM) 24, represented as a read operation mode R and a write operation mode W, FIG. 5(c) depicts address data supplied from the speech path control memory (SCM) 25, if it is used, represented by $A_1$ and $A_2$, and FIG. 5(d) depicts output voice data signals to be read from the speech path memory (SPM) 24 and supplied to the first output bus $BS_{out1}$, represented as $VO_1$ and $VO_2$.

As seen from FIG. 5(b), the speech path memory (SPM) 24 works to achieve both the read operation and the write operation alternately for every time slot. The read operation reads the voice data signals which have already been written into the memory 24 at the corresponding time slot into the frame FR appearing immediately before. The write operation deals with the voice data signals represented by $VI_1$ and $VI_2$. The read operations are achieved in accordance with the address data, such as $A_1$ and $A_2$, supplied by the speech path control memory (SCM) 25, whereby the voice data signals of the desired remaining side subscribers can be read from the memory (SPM) 24. On the other hand, the input voice data signals, such as $VI_1$ and $VI_2$, are automatically sequentially written into individual memory elements, each corresponding to the allotted time slot, of the speech path memory 24. Further, each frame FR has a period of, for example, 125 µs in time and is composed of, for example, 256 time slots, i.e., $TS_0$ through $TS_{255}$. In this case, these time slots $TS_0$ through $TS_{255}$ are allotted, as a rule, to the subscribers numbers as "0" through "255", respectively. If lesser subscribers than that number (256) are accommodated in the switching system concerned, some time slots may be unused. It should be noted, however, that such unused time slots are important constitutents of the present invention to perform the intended mixing of the voice data signals, which will be clarified hereinafter.

Figure 7:
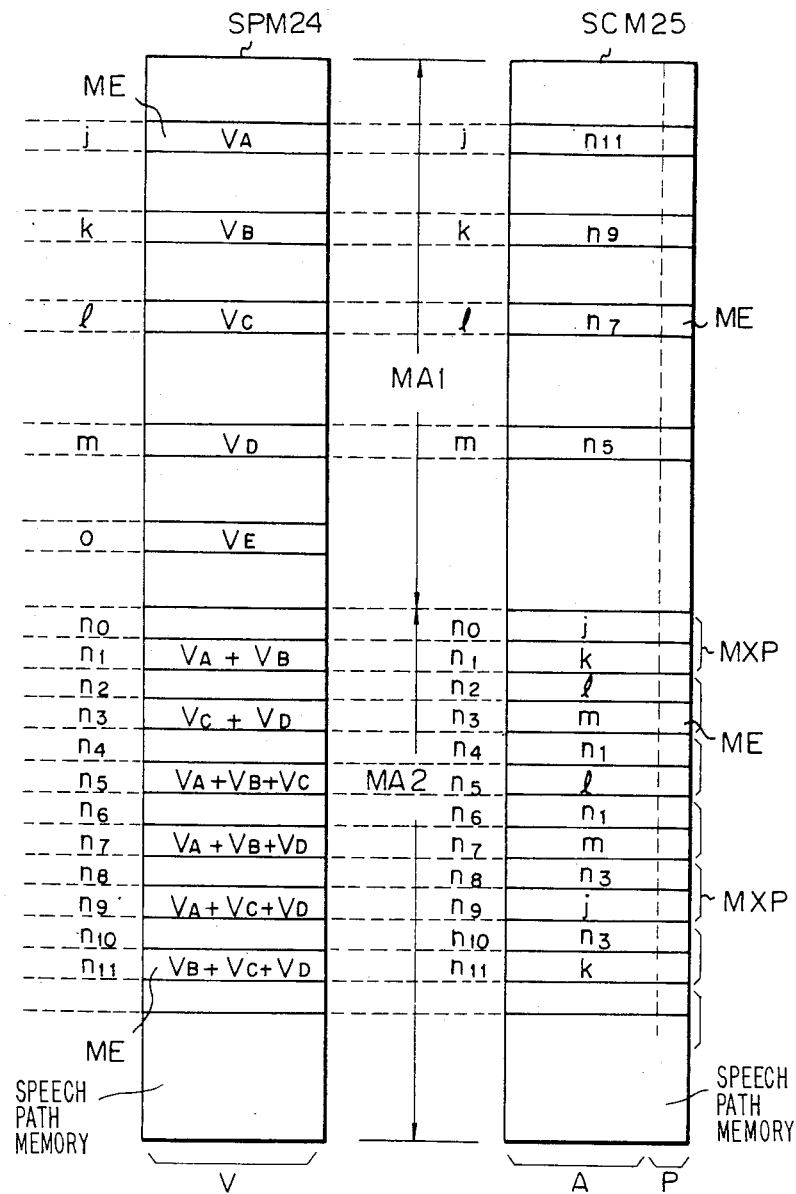
FIG. 7 is a schematic layout view of both the speech path memory (SPM) and the speech path control memory (SCM) for advantageously achieving the mixing operation in the switching system according to the present invention.

FIG. 7 shows a schematic layout of both the speech path memory (SPM) and the speech path control memory (SCM) for advantageously achieving the mixing operation in the switching system according to the present invention. The layout is directed to a case where the mixing operation is performed among, for example, four subscribers (A, B, C, and D), as in the case of FIG. 1. It should be noted, however, that an identical layout can also be applied to other cases, such as where three subscribers and five subscribers need the same mixing operation. This will be clarified by the following explanations. Further, it will consequently be recognized that the present invention features flexible application of the mixing operation to any number of subscribers. In FIG. 7, the left column corresponds to the speech path memory (SPM) 24 in which the digital voice data signals V are stored. The right column corresponds to the speech path control memory (SCM) 25 into which the address data A, used for accessing the speech path memory 24, are written. In other words, information for switching the time slots, i.e., line switching information, are written into the memory 25 in accordance with the related instructions issued from the central control equipment (CC) 26. Also stored therein is control information P, which is to be given to the digital pad (PAD) 27. The digital pad 27 functions, on one hand, to apply a large attenuation to the voice data signals communicated between, for example, the subscribers A and B, i.e., the telephone sets 11A and 11B, both accommodated in the same office, and, on the other hand, to apply a small attenuation to the voice data signals communicated between one subscriber of one office and another of a remote office. This enables equalization of all the voice levels. The equalization in voice levels are important for actual telecommunication conferences, however, it is not so essential for the present invention.

Figure 8:
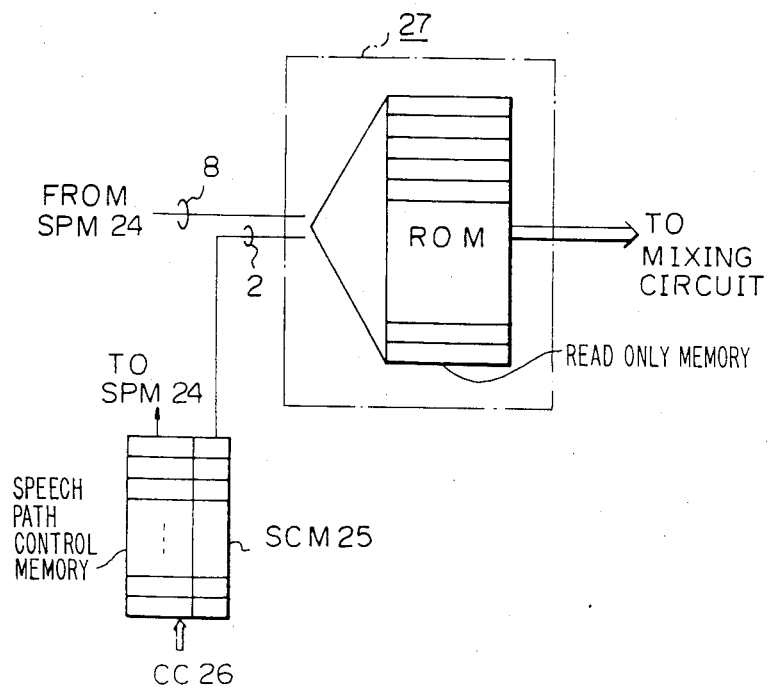
FIG. 8 is one example of a known digital pad.

FIG. 8 is one example of a known digital pad. The digital pad 27 is chiefly fabricated with a read-only memory (ROM). The ROM works to produce output codes each containing the respective attentuation information. To be specific, the ROM is accessed by addresses each comprised of both the 8-bit voice data signal from the SPM and the corresponding 2-bit attentuation specifying signal.

Returning again to FIG. 7, particular attention should be paid to the following two facts. First, the memory elements ME's are considered sectioned into a memory area MA1 for line switching and memory area MA2 for the mixing operation in each of the memories (SPM, SCM) 24 and 25. In this case, the memory areas MA1 for the line switchings per se exist also in the prior art memories (SPM, SCM) 24 and 25 and are inherent thereto. Therefore the memory areas MA2 for the mixing operations play an especially important role in the present invention.

Second, in the memory area MA2 for the mixing operation of the speech path control memory (SCM) 25, the memory elements set up mixing pairs MXP's. This results in each mixing operation being applied to the voice data signals contained in each pair of the two successive time slots. The characters, as shown by j, k, l, n0, n1, and so on in FIG. 7, represent respective addresses per se or address data and are allotted to respective time slots. When the address data is supplied from the speech path control memory (SCM) 25, the voice data signal is read out from the speech path memory (SPM) 24 at an address corresponding to the thus supplied address data. The thus read voice data signal is supplied to the mixing circuit (MIX) of FIG. 4 via the digital pad 27.

Figure 9:
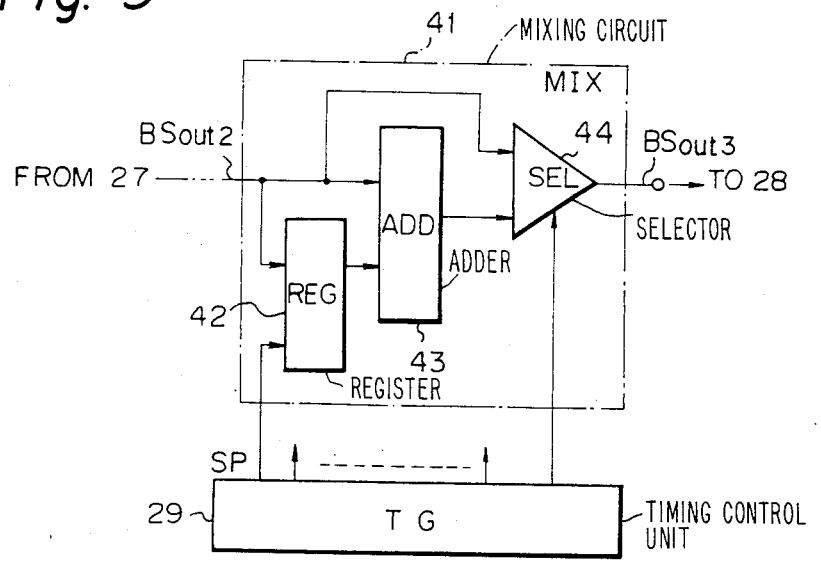
FIG. 9 is a detailed example of the mixing circuit of FIG. 4.

FIG. 9 is a detailed example of the mixing circuit shown in FIG. 4. As seen from FIG. 9, the mixing circuit (MIX) 41 comprises a register (REG) 42, an adder (ADD) 43, and a selector (SEL) 44. The register 42 operates to momentarily store the voice data signal provided via the output bus $BS_{out2}$ from the digital pad 27 for every time slot. The thus momentarily stored voice data signal in the register 42 is digitally added, in the adder 43, with a next supplied digital voice data signal appearing at the time slot next to the preceding time slot. The selector 44 operates to choose either one of the two inputs selectively and transfer the chosen one to the demultiplexer circuit (DMX) 28 via the output bus $BS_{out3}$. The two inputs are, first, the voice data signals after the adder operation at the adder 43 and, second, the usual voice data signals to which no such adder operations are effected. The operations mentioned above are controlled in timing, as a whole, by the timing control unit (TG) 29, which controls the selector 44 to choose the signals of the adder 43 side at every other time slot for the mixing operations.

The central control equipment (CC) 26 performs a usual switching control operation if no telecommunication conference is held. Once a telecommunication conference is requested by the subscribers, the central control equipment 26 operates to allow time slots therefor and to issue a command to the speech path control memory (SCM) 25 to use the thus allotted two slots for the mixing operations.

As may be understood from the preceding explanations, the present invention is characterized by the mixing circuit (MIX) 41 and feedback means. The feedback means is operative to feed the mixed voice data signals back to the speech path memory (SPM) 24. It should be noted that the feedback means mentioned before is formed as an indirect feedback type. To be more specific, the feedback means is realized by the demultiplexer circuit (DMX) 28 and the multiplexer circuit (MX) 22, as understood with reference to FIG. 4, though the actual connecting lines for the feedback are not illustrated therein. On the other hand, it should be noted that identical feedback means can be formed of by a direct feedback type, as explained below.

FIG. 10 illustrates part of a modification of the switching system of FIG. 4, which employs direct feedback means for voice data signals. The direct feedback means is realized with feedback lines 101 and a switching gate 102 with and a mixing circuit (MIX) 41' inserted therein. The mixed voice data signals are accumulated in the speech path memory (SPM) 24 without passing through the multiplexer and demultiplexer circuits 22 and 28. The indirect feedback type telecommunication conference switching system is suitable for relatively small capacities, that is, a small number of congerences subscribers. Since the multiplexer circuit 22 is not used in the system of FIG. 10, the switching gate 102 is required, which is comprised of, for example, a first driver 103 and a second driver 104 inserted in the feedback line 101 and the input bus $BS_{in}$, respectively, and controlled by the timing control unit (TG) 29 so as to energize or deenergize the same selectively. Usually the second driver 104 is energized, but the first driver 103 is energized every time the output from the mixing circuit 41' is provided. The construction of the mixing circuit 41' is slightly different from that of the mixing circuit 41 illustrated in FIG. 9.

Figure 11:
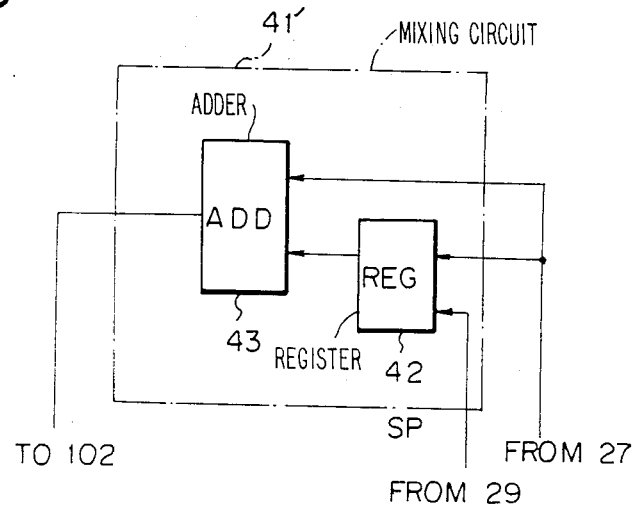
FIG. 11 is a detailed example of the mixing circuit shown in FIG. 10.

FIG. 11 shows a detailed example of the mixing circuit shown in FIG. 10. The difference have relative to the construction of FIG. 9 is that the route bypassing the adder 43 of FIG. 9 is not used.

FIGS. 12(a) through 12(e) depict timing charts used for explaining the mixing operation according to the present invention. The timing charts are viewed from the mixing circuit 41 or 41' (FIGS. 4, 9 and 11). FIG. 12(a) relates to the voice data signals provided to the output bus $BS_{out2}$, i.e., the input of the mixing circuit 41 or 41' and FIG. 12(b) to each set or load pulse SP supplied from the timing control unit (TG) 29. Based on the pulses SP the voice data signals are sequentially introduced into the register (REG) 42. FIG. 12(c) relates to the voice data signals thus introduced into the register 42 by each set pulse SP. FIG. 12(d) relates to a switching state determined by the selector (SEL) 44 of the switching gate 102 (FIG. 10), wherein the "0" state denotes a case where the voice data signals are transferred without passing through the adder (ADD) 43 (if the switching gate 102 is used, the second driver 104 is energized) and the "1" state denotes a case where the voice data signals are transferred by way of the adder 43 (if the switching gate 102 is used, the first driver 103 is energized. FIG. 12(e) relates to the outputs from the adder 43 appearing on the output bus $BS_{out3}$ or the feedback line 101 (if the system of FIG. 10 is used). It should be understood that FIGS. 12(a) through 12(e) refer to an arbitrarily selected one of the frames FR's. Each of the frames FR's is sectioned into the time slot train TSEX for the line switching and the time slot train TSMX for the mixing operation, thus sectioning also characterizes the present invention. In this case, the time slot train TSEX is allotted for usual voice data signal switching, i.e., the signals which need no mixing operation. A detailed explanation of the time slot train TSEX for the usual line switching is omitted, since the time slot train TSEX is not essential to the present invention.

The time slot trains TSEX and TSMS are allotted to the previously described memory area MA1 for line switching and the memory area MA2 for the mixing operation (both shown in FIG. 7). Therefore, the mixing pair MXP in the time slot train TSMS for the line switching corresponds to the above-described mixing pair MXP of the speech path control memory 25 shown in FIG. 7, wherein the mixing pairs MXP's in FIG. 12(a) are specifically illustrated by each two successive time slots, such as "$TS_{r+2}$, $TS_{r+3}$" and "$TS_{r+4}$, $TS_{r+5}$".

Here, characters I, II, III, IV, X, and XI are used to simply distinguish the voice data signals from each other, as shown in FIG. 12(a). The voice data signals I, III, and X are located at the head side in the individual mixing pairs MXP's, as depicted in FIG. 12(a), and are picked up by respective set pulses SP's of FIG. 12(b) to produce the voice data signals I, III, and X to be stored in the register (REG) 42, as shown in FIG. 12(c). Then, the thus stored signals I, III, and X are added, in the adder 43, to the signals II, IV, and XI appearing after these signals I, III, and X, respectively, to produce the resultant mixed voice data signals "I+II", "III+IV", and "X+XI" as shown in FIG. 12(e), respectively. The mixed voice data signals are, at last, accumulated in the speech path memory 24. At this time, nonused time slots 0 are necessarily left for every one time slot, as shown in FIG. 12(e).

The outputs of the adder 43, i.e., the mixed voice data signals, are send from the demultiplexer circuit (DMX) 28, at its respective output terminals, as the output e of FIG. 4 and then input to the multiplexer circuit (MX) 22, at its respective input terminals, as the identical input e. The thus input voice data signals are fed back to the memory area MA2 of the speech path memory (SPM) 24 shown in FIG. 7 and stored in a specified memory element ME. The address of the specified memory element ME is allotted to the time slot to which the related subscriber is allotted, as in normal line switching. Thus, the mixing of the voice data signals is achieved for two subscribers, first, and the thus mixed voice data signals are accumulated in the memory area MA2 of the SPM 24. The mixing and accumulation operation is repeated as follows: the "$V_A+V_B$" accumulation is (sufficient accumulation for mixing for three subscribers) →"$V_A+V_B+V_C$" (sufficient accumulation for mixing for four subscribers) "$V_A+V_B+V_C+V_E$" (sufficient accumulation for mixing for five subscribers, same for later explanation), and "$V_C+V_D$"→"$V_B+V_C+V_D$". As a result, the desired mixed voice data signals are prepared for the telecommunication conference. The plurality of sets of these mixed voice data signals are prepared in a similar manner during each frame FR and will be distributed during the next frame FR in the form of "$V_A+V_B+V_C$", "$V_B+V_C+V_D$", and the like, as illustrated in FIG. 1. A more detailed explanation will follow with reference to FIGS. 13(a), 13(b), 13(c), 13(a'), 13(b'), and 13(c').

FIGS. 13(a), 13(b), 13(c), 13(a'), 13(b'), and 13(c') depict timing charts used for explaining in detail the present invention, taking the case of four subscribers holding a conference as an example. The timing charts of these figures are based on the layout exemplified in FIG. 7 for easy comprehension. Therefore, the following explanations will be made with reference to FIGS. 4, 7, 9, and 12(a) through 12(e). FIGS. 13(a) and 13(a') show two parts of a single line. The same applies to FIGS. 13(b), 13(b') and FIGS. 13(c), 13(c'). FIGS. 13(a) and 13(a') relate to the voice data signals transferred on the input bus $BS_{in}$, FIGS. 13(b) and 13(b') to the voice data signals on the output buses $BS_{out2}$ and $BS_{out3}$, and FIGS. 13(c) and 13(c') to the voice data signals on the output bus $BS_{out3}$. In this case, the voice data signals on the bus $BS_{out3}$ are assumed to be the same as those on the bus $BS_{out2}$ for the sake of simplicity. That is, no adjustment, by the digital pad 27, with respect to the level of the voice data signals is executed. Further, for the sake of simplicity, no time delay caused by the circuit elements is taken into consideration. Furthermore, the frame, shown as FR commonly in FIGS. 13(a) through 13(c'), is sectioned, as previously mentioned, into the time slot train TSEX for the line switching and the time slot train TSMX for the mixing operation, which time slot trains are composed of, as a whole, the time slots $TS_0$, $TS_j$, $TS_k$ - - - $TS_{n0}$, $TS_{n1}$ - - - $TS_{n11}$. The suffixes such as j, k, n0, n1, n11, - - - accompanying each character TS, are allotted to the addresses j, k, n0, n1, n11, - - - for accessing the speech path control memory (SCM) 25. The suffixes j, k, n0, n1, n11 - - - which are stored in the speech path control memory (SCM) 25. In the operation, first, the voice data signals appear, such as shown by $V_A$, $V_B$, $V_C$ - - - in front part of FIG. 13(a), and are then written into the speech path memory (SPM) 24 at the corresponding addresses j, k, 1 - - - , respectively. The write operation is represented by characters W.SPM in the related drawing. The thus written voice data signals are then supplied to the output buses $BS_{out1}$ and $BS_{out2}$, as depicted in the front part of FIG. 13(b'), this being done by the read operation in the speech path memory 24, which read operation is represented by characters SPM.R. The above operations will be clarified along with the example shown in FIG. 7. According to the example of FIG. 7, the address data j is stored in the speech path control memory 25 at its address n0, corresponding to the time slot $TS_{n0}$ (FIG. 13), of the memory area MA2 for the mixing operation. Therefore, the content at the address j in the speech path memory 24 is read therefrom as, in this case, the voice data signal $V_A$ and then supplied to the output buses $BS_{out1}$ and $BS_{out2}$. In a similar way, these buses $BS_{out1}$ and $BS_{out2}$ are supplied with the voice data signals $V_B$, $V_C$ - - - one by one, as depicted in the front part of FIG. 13(b'), and then applied to the mixing circuit (MIX) 41. In the mixing circuit 41, the add operations are executed at the adder 43 to produce the mixed voice data signals in the form of "$V_A+V_B$", which will then be provided to the output bus $BS_{out3}$. The add operation is represented by characters ADD in the realted figure.

The mixed voice data signals are fed back, by way of the demultiplexer circuit (DMX) 28, to the multiplexer circuit (MX) 22 and appear again on the input bus $BS_{in}$ in the form of "$V_A+V_B$" at the time slot $TS_{n1}$ as depicted in the front part of FIG. 13(a'). The signals "$V_A+V_B$" concerned are again written into the speech path memory 24 at its addresses n1 as illustrated by "$V_A+V_B$" of the memory 24 in FIG. 7. This completes the first stage accumulation of the voice data signals. It should be understood that, regarding the transition of the operation from the front part of FIG. 13(c') to the front part of FIG. 13(a'), i.e., the transfer of the mixed voice data signals "$V_A+V_B$" from the demultiplexer circuit 28 to the multiplexer circuit 22 along the arrow concerned (DMX→MX), a slight delay time inevitably and actually accompanies the related transfer. However, in the figure, the delay time is disregarded so as to facilitate understanding of the operation. The operations heretofore described relating to the signals "$V_A+V_B$" also apply to other signals "$V_C+V_D$" and so on for accumulate the voice data signals.

At the time slot $TS_{n4}$, according to the address data n1 stored in the memory 25 of FIG. 7 at its address n4, the content stored in the memory 24 of FIG. 7 at the thus specified address n1 is read therefrom as the signals "$V_A+V_B$" and then supplied to the output buses $BS_{out1}$ and $BS_{out2}$. At the same time, the thus supplied voice data signals "$V_A+V_B$" are mixed, at the time slot $TS_{n5}$ followed next, with the voice data signal $V_C$, at the mixing circuit 41, which now appears on the same buses. In this case, the voice data signal $V_C$ is read from the memory 24 of FIG. 7 at its address 1, which is specified by the address data 1 stored in the memory 25 of FIG. 7 at the address n5 corresponding to the time slot $TS_{n5}$. As a result, the thus mixed voice data signals at the circuit 41 are provided to the output bus $BS_{out3}$ in the form of "$V_A+V_B+V_C$" and transferred via the demultiplexer circuit 28 and the multiplexer circuit 22, to the memory 24 again to achieve the related accumulation therein at its address n5 relating to the time slot $TS_{n5}$, as shown by "$V_A+V_B+V_C$" in FIG. 7.

In a similar way, other mixed voice data signals, such as $\mp V_A+V_B+V_D$", are also accumulated and stored in the memory area MA2 for the mixing operation. Thus, the mixing operations, in the frame FR concerned, of the voice data signals from the four subscribers are completed. Soon after this, the mixed voice data signals, for example, "$V_A+V_C+V_D$" of FIG. 7, are read according to the address data n9 which is stored in the memory 25 at its address k. The thus read mixed voice data signals "$V_A+V_C+V_D$" are output, as they are, from the selector (SEL) 44 of the mixing circuit 41, i.e., without passing through the adder 43 of the circuit 41 (refer to the "0" state in FIG. 12(d), at the time slot $TS_k$ in the time slot train TSEX for the mixing operation of the next coming frame FR, to the telephone set 11B to which the time slot $TS_k$ is allotted in advance. Thus, the telephone set 11B receives the mixed voice data signals "$V_A+V_C+V_D$" as illustrated in FIG. 1. The same applies for the remaining telephone sets 11A, 11C, and 11D. They receive the mixed voice data signals except their own signal, such as shown by "$V_B+V_C+V_D$", "$_A+V_B+V_D$", and "$V_A+V_B+V_C$" in FIG. 1.

The voice data signals with the apostrophes in FIGS. 13(b) and 13(c) indicate mixed voice data signals which have been prepared during the preceding frame FR and stored in the memory 24. These mixed voice data signals are also transferred to the respective telephone sets at each time slot TS allotted thereto, respectively. This complete the mixing operation for four subscribers.

Figure 14:
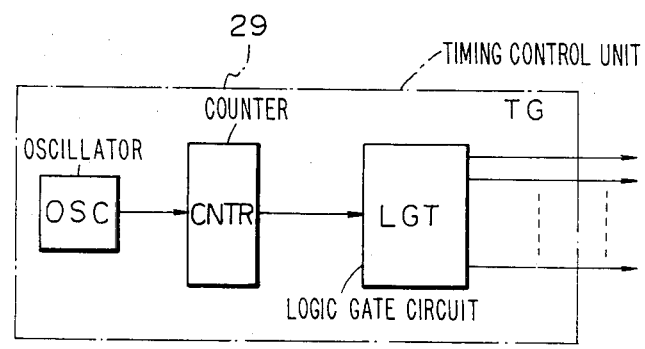
FIG. 14 illustrates the general construction of the timing control unit 29.

The timing controls for both the mixing operation and the line switching operation can be realized by means of the timing control unit (TG) 29. FIG. 14 illustrates a general construction of the timing control unit (TG) 29. The timing control unit (TG) 29 is mainly comprised of an oscillator OSC, a counter CNTR, and a logic gate circuit LGT. The oscillator OSC generates master clock pulses with which all the operations are synchronized. The counter CNTR operates as a frequency divider to produce relatively low frequency signals for use for various operations for the switching and mixing. The timing control signals for various operations are produced in the logic gate circuit LGT and supplied to the corresponding circuit blocks along the arrows extending outside the unit (TG) 29. The arrows correspond to those in FIG. 4.

Finally, referring again to FIG. 12(e), it has been stated that nonused time slots 0 are necessarily created by the present invention. Accordingly, the corresponding nonused memory elements ME's are also created in the speech path memory 24 as shown, at the addresses n0, n2, n4, and so on, in FIG. 7. This is due to the provision of mixing pairs MXP's each composed of two successive time slots. The thus created nonused memory elements ME's can be left as they are, i.e. empty but are preferably utilized to accommodate various kinds of digital tones, such as busy tones and dial tones.

As explained above in detail, the switching system of the present invention enables a telecommunication conference with a plurality of subscribers. The number of the subscribers can be freely increased without installing more hardware. Furthermore, it is not required to increase the scale of the mixing trunk along with the increase in the traffic of the telecommunication conferences to be held, which means that the system of the present invention is not influenced by variation of the amount of traffic.

We claim:

1. A switching system having telecommunication conference capability and including central control equipment and connected to subscriber lines, said system comprising:
   a multiplexer circuit for time division multiplexing a plurality of voice data signals transmitted via respective subscriber lines;
   switching means being under operative control of the central control equipment and including, at least, a speech path memory for sequentially storing the multiplexed voice data signals from said multiplexer circuit;
   a demultiplexer circuit for demultiplexing the switched voice data signals and transmitting the voice data signals to subscribers via respective subscriber lines; and
   mixing and feedback means for merging two voice data signals, and feeding the mixed voice data signals back to said speech path memory to write again the feedback voice data signals therein, and accumulating the thus mixed voice data signals in said speech path memory for each of the subscribers by using the individual voice data signals except for the voice data signal of the target subscriber, and each of the thus accumulated voice data signals is returned, from the speech path memory, to respective subscribers via the corresponding subscriber lines.

2. A switching system as set forth in claim 1, wherein said mixing and feedback means is connected in a path between said demultiplexer circuit and said multiplexer circuit.

3. A switching system as set forth in claim 2, wherein said switching means comprises both a speech path control memory and said speech path memory, said speech path memory being accessed by address data supplied by said central control equipment, and stored in said speech path control memory.

4. A switching system as set forth in claim 3, wherein read and write operations for said speech path memory are achieved under a random read and sequential write mode in synchronization with predetermined time slots arranged in time sequential series.

5. A switching system as set forth in claim 4, wherein said speech path memory includes both a first memory area used for the line switching and a second memory area used for the mixing operation, and said speech path control memory includes both a first memory area used for the line switching and a second memory area used for the mixing operation.

6. A switching system as set forth in claim 5, wherein the second memory area of said speech path control memory stores address data for specifying an address at which, in said speech path memory, the voice data signals to be mixed are stored and stores address data for specifying a corresponding address at which, in said speech path memory, the mixed voice data signals are to be accumulated.

7. A switching system as set forth in claim 6, wherein a plurality of mixing pairs are provided in time series to said second memory area for the mixing operation of said speech path control memory, each said mixing pair is defined by successive time slots, in which the addresses of the first and second memory are for the line switching, and the mixing operations in both said speech path and speech path control memories are allotted to individual time slots in time series, so that each of the mixing operations is applied to the voice data signals specified by addresses determined by the address data of each said mixing pair stored in said speech path control memory.

8. A switching system as set forth in claim 7, wherein said mixing and feedback means comprises a mixing circuit and said mixing circuit comprises a register connected to said speech path memory, an adder connected to said register and said speech path memory, and a selector connected to said adder, said speech path memory and said demultiplexer circuit, said adder is operative to receive, at a first input, each of said voice data signals provided from said speech path memory, said register is operative to receive and momentarily store therein each of said voice data signals to apply same to said adder at a second input, and said selector is operative to selectively pass therethrough either said voice data signal unchanged or an output signal from said adder and transfer the signal to said demultiplexer circuit.

9. A switching system as set forth in claim 8, wherein said mixing circuit includes a digital pad connected between said mixing circuit and said speech path memory for attentuation of the voice data signals.

10. A switching system as set forth in claim 9, further comprising a timing control unit comprising an oscillator, a counter connected to said oscillator and a logic gate circuit connected to said mixing ciruit and said speech path memory, wherein the line switching operation and the mixing operation are timing controlled by said timing control unit, said oscillator generates master clock pulses with which operations are synchronized, said counter operator as a frequency divider to produce relatively low frequency signals suitable for the line switching and the mixing operation, and the logic gate circuit operates to produce timing control signals suitable for the operations.

11. A switching system as set forth in claim 1, wherein said speech path memory includes an input and an output and said feedback means is connected in a path between the output of said speech path memory and the input thereof, in which path said mixing circuit is connected.

12. A switching system as set forth in claim 11, further comprising a switching gate and wherein outputs from said multiplexer circuit and said mixing circuit are applied to said speech path memory selectively by said switching gate.

13. A switching system as set forth in claim 12, wherein said switching means comprises both a speech path control memory and said speech path memory, said speech path memory being accessed by address data supplied by said central control equipment, and stored in said speech path control memory.

14. A switching system as set forth in claim 13, wherein read and write operations for said speech path memory are achieved under a random read and sequential write mode in synchronization with predetermined time slots arranged in the time sequential series.

15. A switching system as set forth in claim 14, wherein said speech path memory includes both a first memory area used for the line switching and a second memory area used for the mixing operation, and said speech path control memory includes both a first memory area used for the line switching and a second memory area used for the mixing operation.

16. A switching system as set forth in claim 15, wherein the second memory area of said speech path control memory stores address data for specifying an address at which, in said speech path memory, the voice data signals to be mixed are stored and stores address data for specifying a corresponding address at which, in said speech path memory, the mixed voice data signals are to be accumulated.

17. A switching system as set forth in claim 16, wherein a plurality of mixing pairs are provided in time series in said second memory area for the mixing operation of said speech path control memory, each said mixing pair is defined by successive time slots in which the addresses of the first and second memory areas for the line switching, and mixing operations in both said speech path and speech path control memories are allotted to individual time slots in the time series, so that each of the mixing operations is applied to the voice data signals specified by the addresses determined by the address data of each said mixing pair stored in said speech path control memory.

18. A switching system as set forth in claim 17, wherein said mixing and feed back means comprises a mixing circuit and said mixing circuit comprises a register connected to said speech path memory and an adder, connected to said register and said speech path memory, having first and second inputs, said adder is operative to receive at its first input each of said voice data signals provided from said speech path memory, said register is operative to receive and momentarily store therein each of said voice data signals to apply same to said adder at its second input, and said switching gate is operative to selectively pass therethrough either said voice data signal from said multiplexer circuit unchanged or the output signal from said adder and transfer the signal to said speech path memory.

19. A switching system as set forth in claim 18, further comprising a digital pad for attenuation of the voice data signal, and connected between said speech path memory at its output and said mixing circuit.

20. A switching system as set forth in claim 19, further comprising a timing control unit comprising an oscillator, a counter connected to said oscillator and a logic gate circuit connected to said mixing circuit and said speech path memory, wherein the line switching operation and the mixing operation are timing controlled by said timing control unit, said oscillator generates master lock pulses with which operations are synchronized, counter operates as a frequency divider to produce relatively low frequency signals suitable for the line switching and the mixing operation, and the logic gate circuit operates to produce timing control signals suitable for the operations.

21. A conference switching system, comprising:
a multiplexer having inputs operatively connected to subscriber lines and an output for time division multiplexed subscriber voice data signals;
mixing means, connected to the output of said multiplexer, for mixing the subscriber voice data signals and providing conferenced voice data signals at an output;
demultiplexer means, having outputs connected to the subscribers, for time division demultiplexing the conferenced voice data signals to the subscriber; and
said mixing means comprising:
a switching gate connected to said multiplexing circuit;
a speech path memory connected to said switching gate and said demultiplexer means, having a first storage area for the subscriber voice data signals and a second storage area for the conferenced voice data signals; and a mixing circuit, connected to said speech path memory and said switching gate, for mixing the subscriber voice data signals to produce the conferenced voice data signals to be stored in the second storage area of said speech path memory.

22. A conference switching system, comprising:

a multiplexer having inputs operatively connected to subscriber lines and an output for time division multiplexed subscriber voice data signals;

mixing means, connected to the output of said multiplexer, for mixing the subscriber voice data signals and providing conferenced voice data signals at an output;

demultiplexer means, having outputs connected to the subscribers, for time division demultiplexing the conferenced voice data signals to the subscriber; and said mixing means comprising:

a speech path memory connected to the output of said multiplexer and having a first storage area for the subscriber voice data signals and a second storage area for the conferenced voice data signals; and a mixing circuit, connected between said speech path memory and said demultiplexer means, for mixing the subscriber voice data signals to produce the conferenced voice data signals to be stored in the second storage area of said speech path memory, and some of the outputs of said demultiplexer means are connected to some of the inputs of said multiplexer.

* * * * *

UNITED STATES PATENT AND TRADEMARK OFFICE
CERTIFICATE OF CORRECTION

PATENT NO. : 4,656,625
DATED : April 7, 1987
INVENTOR(S) : Nojiri et al.

It is certified that error appears in the above-identified patent and that said Letters Patent is hereby corrected as shown below:

Column 1, line 43, "deel" should be --deal--.

Column 2, line 9, "memory, 24" should be --memory 24,--.

Column 3, line 52, "(CC0" should be --(CC)--.

Column 7, line 60, "congerences" should be --conferenced--.

Column 10, line 68, "$\mp V_A$" should be --"$V_A$--.

Column 11, line 20, ""$_A+V_B$" should be --$V_A+V_B$--.

FRONT PAGE [57], lines 10 and 11, "the subscriber's subscriber except each" should be --each subscriber except the subscriber's--.

Signed and Sealed this

Twenty-second Day of September, 1987

Attest:

DONALD J. QUIGG

Attesting Officer     Commissioner of Patents and Trademarks